US012650929B2

(12) United States Patent　(10) Patent No.:　US 12,650,929 B2
Moon et al.　(45) Date of Patent:　Jun. 9, 2026

(54) SMART MEMORY MODULE, HOST SYSTEM HAVING SMART MEMORY MODULE, AND METHOD OF OPERATING SMART MEMORY MODULE

(71) Applicant: Samsung Electronics Co., Ltd., Suwon-si (KR)

(72) Inventors: Sungup Moon, Suwon-si (KR); Byungyo Lee, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 18/668,455

(22) Filed: May 20, 2024

(65) Prior Publication Data

US 2025/0190366 A1　Jun. 12, 2025

(30) Foreign Application Priority Data

Dec. 7, 2023　(KR) ........................ 10-2023-0176359

(51) Int. Cl.
*G06F 12/123*　(2016.01)
*G06F 12/0804*　(2016.01)
(52) U.S. Cl.
CPC ........ *G06F 12/123* (2013.01); *G06F 12/0804* (2013.01)
(58) Field of Classification Search
CPC ...... G06F 3/0604; G06F 3/061; G06F 3/0614;
G06F 3/0647; G06F 3/0656; G06F
3/0658; G06F 3/0659; G06F 3/067; G06F
9/4856; G06F 9/544; G06F 12/0804;

G06F 12/0868; G06F 12/0888; G06F
12/123; G06F 13/4221; G06F 2212/1016;
G06F 2212/1024; G06F 2212/1032
See application file for complete search history.

(56) References Cited

U.S. PATENT DOCUMENTS

| | | | |
|---|---|---|---|
| 8,327,060 B2 | 12/2012 | Heim | |
| 8,819,678 B2 | 8/2014 | Tsirkin | |
| 9,936,019 B2 | 4/2018 | Sanderson | |
| 10,083,053 B2 | 9/2018 | Dong | |
| 10,241,814 B2 | 3/2019 | Tsirkin | |
| 10,977,064 B2 | 4/2021 | Tsirkin | |
| 11,169,835 B1 | 11/2021 | Duong et al. | |
| 2011/0131568 A1* | 6/2011 | Heim .................. G06F 9/45558 |
| | | | 718/1 |
| 2018/0150335 A1* | 5/2018 | Doi ....................... G06F 9/5088 |
| 2019/0079695 A1 | 3/2019 | Ekbote et al. | |

(Continued)

OTHER PUBLICATIONS

Extended European Search Report dated Oct. 22, 2024 for corresponding European Application No. 24182783.1.

*Primary Examiner* — Aracelis Ruiz
(74) *Attorney, Agent, or Firm* — Harness, Dickey & Pierce, P.L.C.

(57)　ABSTRACT

A smart memory module includes at least one memory device connected to at least one channel, a controller configured to control the at least one memory device, and a host interface circuit configured to perform peer-to-peer (P2P) communication with an external device, and to receive, from a host device, a live migration request. The controller is configured to perform, in response to the live migration request, a migration operation of transmitting buffer data to a target device through the P2P communication under a buffer-full condition.

15 Claims, 19 Drawing Sheets

(56) References Cited

U.S. PATENT DOCUMENTS

| | | |
|---|---|---|
| 2019/0364105 A1 | 11/2019 | Lou et al. |
| 2021/0263762 A1 | 8/2021 | Kachare et al. |
| 2023/0298129 A1 | 9/2023 | Puffer et al. |
| 2023/0333877 A1 | 10/2023 | Long et al. |

* cited by examiner

S210

Perform initialization for Live Migration

S220

Receive Live Migration request

S230

Perform Live Migration using LRU buffer cache

S240

Perform Buffer Flush

SMART MEMORY MODULE, HOST SYSTEM HAVING SMART MEMORY MODULE, AND METHOD OF OPERATING SMART MEMORY MODULE

CROSS-REFERENCE TO RELATED APPLICATION(S)

This application claims benefit of priority to Korean Patent Application No. 10-2023-0176359 filed on Dec. 7, 2023 in the Korean Intellectual Property Office, the disclosure of which is incorporated herein by reference in its entirety.

BACKGROUND

The present inventive concepts relate to smart memory modules, host systems having the same, and methods of operating the same.

In general, live migration may be a process providing high availability and service continuity by moving critical running service programs to another environment without interruption. Live migration may be used in situations such as database upgrades, hardware transfers, and data center transfers, and may have core features, such as providing uninterrupted service and maintaining data consistency. Live migration may need to be carefully planned considering data consistency assurance, transaction management, data loss prevention, logging and monitoring, and performance optimization, and may be mainly used for large-scale databases and critical business systems.

SUMMARY

Some aspects of the present inventive concepts provide novel smart memory modules supporting live migration, host systems including the same, and methods of operating the same.

According to some aspects of the present disclosure, there is provided a smart memory module including at least one memory device connected to at least one channel, a controller configured to control the at least one memory device, and a host interface circuit configured to perform peer-to-peer (P2P) communication with an external device, and to receive, from a host device, a live migration request. The controller may be configured to perform, in response to the live migration request, a migration operation of transmitting buffer data to a target device through the P2P communication under a buffer-full condition.

According to some aspects of the present disclosure, there is provided a method of operating a smart memory module, the method including performing an initialization operation for live migration from a host device, receiving, from the host device, a live migration request, and performing, in response to the live migration request, a migration operation using a least recently used (LRU) buffer cache. The migration operation may flush data stored in the LRU buffer cache to a target device through P2P communication, in response to the LRU buffer cache being full.

According to some aspects of the present disclosure, there is provided method of operating a smart memory module, the method including receiving, from a host device, a live migration request, starting a migration loop in response to the live migration request, transmitting, to a destination device, block data corresponding to the migration loop through P2P communication, moving, to the destination device, a migration window separating a migrated area and a not yet migrated area from each other according to transmission of the block data, performing a next migration loop, in response to the migration window not being a last migration window, and flushing, to the destination device, data stored in a least recently used (LRU) buffer cache through the P2P communication, in response to the migration window being the last migration window.

According to some aspects of the present disclosure, there is provided a host system including a source server, a source device connected to the source server, a destination server, a destination device connected to the destination server, a network fabric configured to connect the source device and the destination device to each other, and a fabric manager configured to control the network fabric. The source device may be configured to receive, from the source server, a live migration request, and to perform, in response to the live migration request, a migration operation on the destination device through P2P communication.

According to some aspects of the present disclosure, there is provided a computing system including at least one memory module, at least one processor configured to control the at least one memory module, a switch connected to the at least one processor through a compute express link (CXL) interface, at least one memory device connected to the switch through the CXL interface, and at least one storage device connected to the switch through the CXL interface. At least one of the at least one memory device and the at least one storage device may be configured to perform, in response to a live migration request of the at least one processor, a migration operation.

BRIEF DESCRIPTION OF DRAWINGS

The above and other aspects, features, and advantages of the present inventive concepts will be more clearly understood from the following detailed description, taken in conjunction with the accompanying drawings, in which.

DETAILED DESCRIPTION

Figure 1:
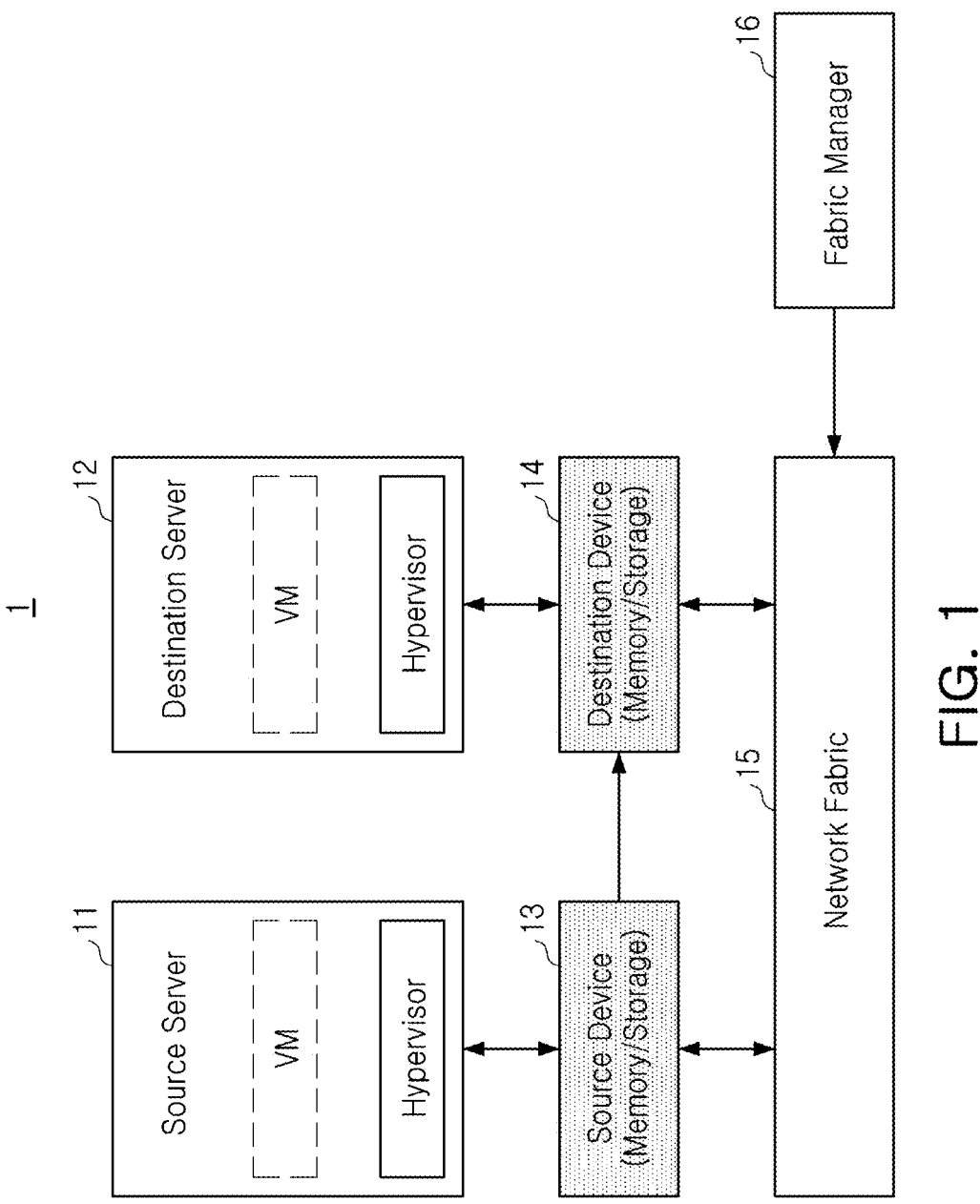
FIG. 1 is a diagram illustrating a host system 1 according to some example embodiments of the present inventive concepts.

Hereinafter, example embodiments of the present inventive concepts will be described clearly and specifically such that a person skilled in the art easily could carry out example embodiments using the drawings.

A typical data center supports live migration, where memory and storage contents are transferred to different hosts in anticipation of system errors to ensure high availability of the system. However, the process is complex and repetitive due to copying through host software, resulting in significant overhead.

In contrast, a host system according to some example embodiments of the present invention may support device-to-device communication via peer-to-peer connections. Therefore, the host system of the present invention can perform rapid live migration by supporting offloading for live migration through copying to remote memory via NIC (Network Interface Card) from memory devices. Offloading the operation of live migration minimizes (for example, reduces or lessens) system resource usage and significantly improves processing speed. Additionally, offloading dirty block management during live migration may improve the operation procedure. Here, dirty blocks refer to blocks that need to be synchronized from the source virtual machine to the destination virtual machine to ensure memory consistency between them.

A smart memory module, a host system having the same, and an operation method according to some example embodiments of the present invention may minimize (for example, reduce or lessen) host overhead by offloading live migration (Live Migration) between devices supporting peer-to-peer (P2P) communication such as CXL (Compute Express Link) into the device.

The host system according to some example embodiments of the present invention may be implemented with a hypervisor and virtual machines that support live migration. A hypervisor and virtual machine are technologies that efficiently utilize hardware resources and enable running multiple operating systems on a single physical server. The hypervisor is software or firmware that manages and controls hardware virtualization, primarily allocating hardware resources such as CPU (Central Processing Unit), memory, storage, network, etc., to virtual machines. Additionally, virtual machines run operating systems independently. Bare-Metal Hypervisor operates directly on hardware without the host system's operating system, such as VMWARE VSPHERE/ESXI®, MICROSOFT HYPER-V®, XEN®, etc. Hosted Hypervisor runs on top of the host operating system and operates alongside it, such as ORACLE VIRTUALBOX®, VMWARE WORKSTATION®, PARALLELS DESKTOP®, etc.

A virtual machine is a virtual environment running on top of the hypervisor. By behaving like running its own operating system and applications, virtual machines may operate multiple virtual machines independently on a single physical server. This environment may increase the efficiency of server computing resources. Virtual machines may host various operating systems, for example, running a LINUX® virtual machine on top of a WINDOWS® operating system or vice versa.

In summary, the hypervisor is software or firmware managing hardware virtualization, and virtual machines are virtual environments running on top of the hypervisor, capable of running various operating systems and applications. Such virtualization technologies may increase resource utilization and management efficiency, simplifying system administration and maintenance.

Furthermore, the host system according to some example embodiments of the present invention may reduce overhead of host software such as hypervisors through device-driven migration via P2P protocols. It may also apply live migration to both Memory IO (Load/Store) and Storage IO (Read/Write) due to the capability of device-to-device transmission via P2P protocols. The host system may support transmission optimization through internal buffers.

FIG. 1 is a diagram illustrating a host system 1 according to some example embodiments of the present inventive concepts. Referring to FIG. 1, the host system 1 may include a source server 11, a destination server 12, a source device 13, a destination device 14, a network fabric 15, and a fabric manager 16.

The source device 13 and destination device 14 may be implemented to be directly connected to the source server 11 and the destination server 12 so as to support live migration. Here, direct connection may apply hardware acceleration technology similar to single Root I/O virtualization (SR-IOV) to a virtual machine (VM). A hypervisor of a host device may request a migration-related operation for the device. However, IO occurring in the VM may not be monitored and verified. In this case, for live migration operations between hypervisors, connection may be performed through a fabric switch, such as CXL version 3, enabling P2P transmission between devices.

The network fabric 15 may be implemented as a network architecture having high performance, availability, and expandability. The network fabric 15 may include fabric switches (a core switch, an edge switch, and the like), a router, a gateway, a load balancer, a firewall, and the like. The network fabric 15 may enable direct connection between the source device 13 and the destination device 14.

The fabric manager 16 may be implemented to control the network fabric 15 using an attaching/detaching method for device connection for P2P transmission. The fabric manager 16 may centrally manage configurations of network devices (a switch, a router, a firewall, and the like) and components (a virtual machine, a storage device, and the like), thereby allowing a network manager to effectively change and update a network configuration. The fabric manager 16 may monitor a status of a network in real time and collect performance data, thereby allowing a network issue to be rapidly detected and resolved. In addition, network efficiency may be improved by analyzing a traffic pattern and log data. The fabric manager 16 may manage and monitor a network security policy, thereby identifying a security event and taking a countermeasure. The fabric manager 16 may generate a notification about a network event and a failure, and may provide the notification to the manager, thereby enabling rapid response in the event of a failure. The fabric manager 16 may provide a function of automating and orchestrating a network task, thereby simplifying network management and operation and improving efficiency. The fabric manager 16 may play a critical role in improving network reliability, availability, security, and performance to efficiently manage and maintain complicated network infrastructure.

The host system 1 according to the present inventive concepts may offload a migration operation by performing device-driven live migration using a P2P communication function.

Each of the source device 13 and destination device 14 according to the present inventive concepts may be implemented as a smart memory module supporting P2P communication between devices. Here, the smart memory module may be implemented as a memory device or a storage device.

Figure 2A:
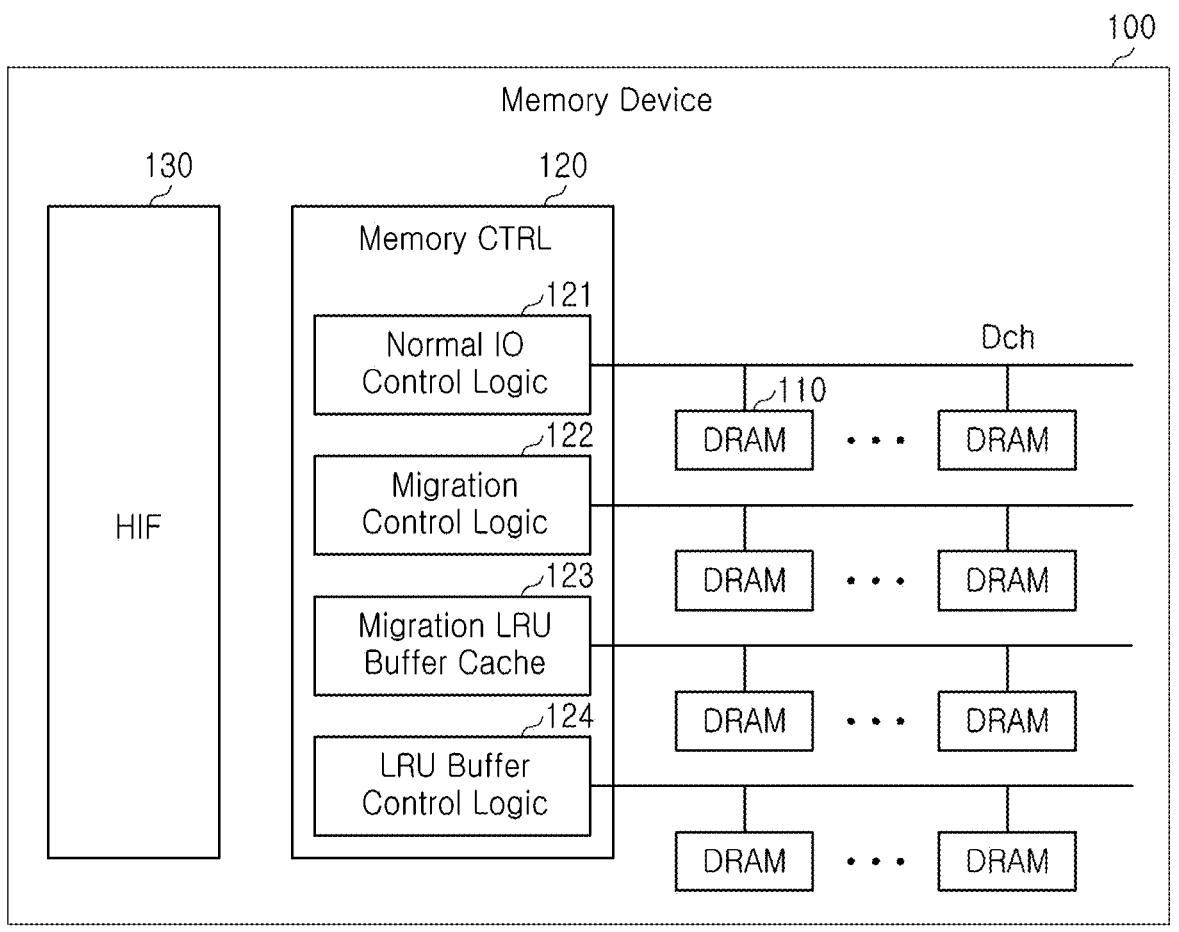
FIG. 2A is a diagram illustrating a smart memory module 100 according to some example embodiments of the present inventive concept.

FIG. 2A is a diagram illustrating a smart memory module 100 according to some example embodiments of the present inventive concepts. Referring to FIG. 2A, the smart memory module 100 may include at least one volatile memory device 110 (DRAM) connected to at least one channel Dch, a memory controller 120, and a host interface circuit 130.

The at least one volatile memory device 110 may be implemented as static random access memory (SRAM), dynamic RAM (DRAM), synchronous RAM (SDRAM), or the like.

The memory controller 120 may be implemented to control the at least one volatile memory device 110. The memory controller 120 may include a normal input/output control logic 121, a migration control logic 122, a migration last recently used (LRU) buffer cache 123, and an LRU buffer control policy 124.

The normal input/output control logic 121 may be implemented to process a VM load/store instruction (64B Memory IO) requested through the host interface circuit 130. That is, IO processing for the memory device (DRAM) may be performed through the normal input/output control logic 121. The migration control logic 122 may be implemented to control an operation for migration requested by a hypervisor. The migration LRU buffer cache 123 may be implemented to store data according to a LRU buffer policy so as to minimize (for example, reduce or lessen) frequent bus occupancy occurring when a store request requested by a VM is directly transmitted to a destination device during the migration operation. The LRU buffer control policy 124 may be implemented to control the migration LRU buffer cache 123 to process LRU and similar LRU-based buffering policies. In some example embodiments, there may be a migration LRU buffer cache 123 capable of buffering and storing a normal IO of a user according to the LRU buffer control policy. The LRU buffer control policy 124 may be implemented in terms of hardware, software, or firmware.

The host interface circuit 130 may be connected to a hypervisor of a host device and a destination device, and thus may be implemented to perform communication. In some example embodiments, the host interface circuit 130 may be implemented as a P2P interface, for example, a CXL interface.

Figure 2B:
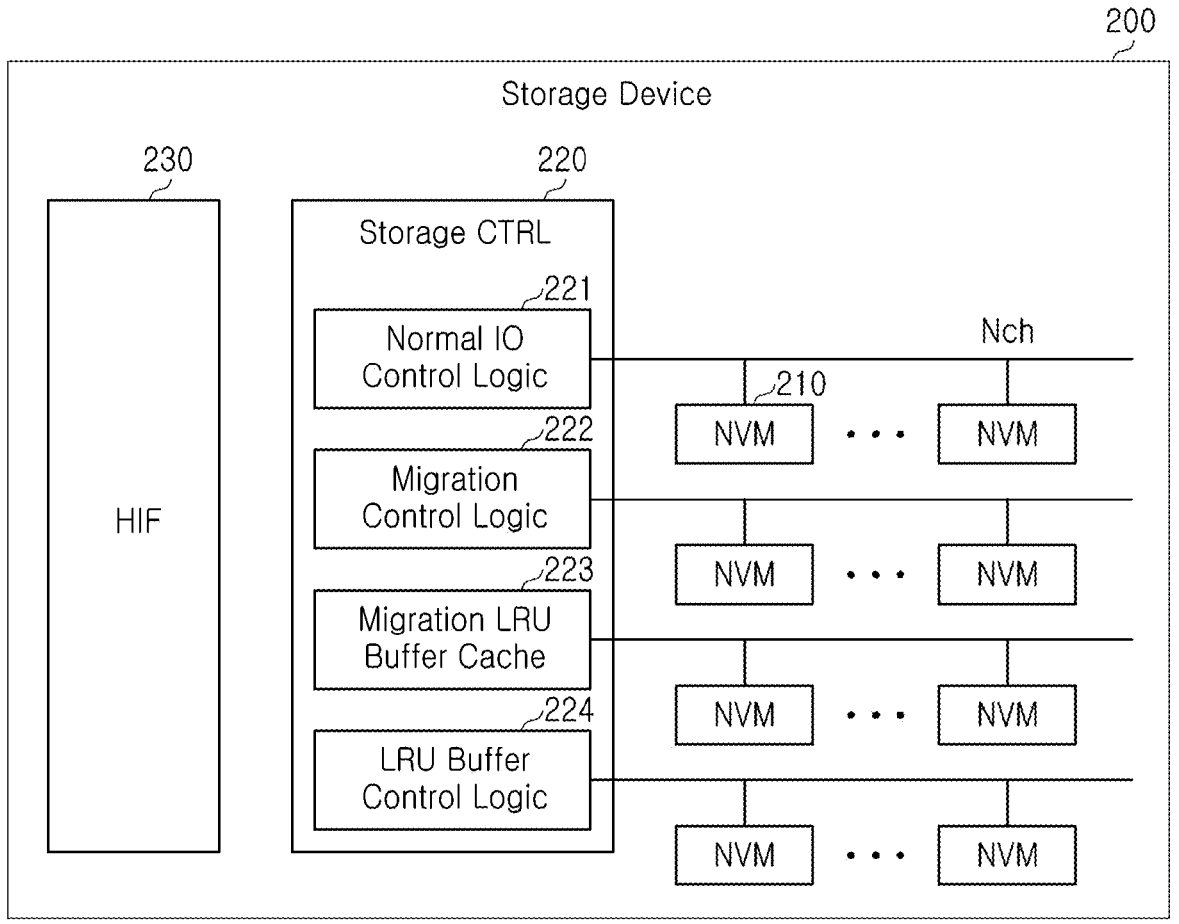
FIG. 2B is a diagram illustrating a smart memory module 200 according to some example embodiments of the present inventive concepts.

FIG. 2B is a diagram illustrating a smart memory module 200 according to some example embodiments of the present inventive concepts. Referring to FIG. 2B, the smart memory module 200 may include at least one non-volatile memory device 210 (NVM) connected to at least one channel Nch, a storage controller 220, and a host interface circuit 230.

The at least one non-volatile memory device 210 may be implemented as NAND flash memory, NOR flash memory, phase-change RAM (PRAM), magneto-resistive RAM (MRAM), resistive RAM (ReRAM), ferro-electric RAM (FRAM), or the like.

The storage controller 220 may include a normal input/output control logic 221, a migration control logic 222, a migration LRU buffer cache 223, and a LRU buffer control policy 224.

The normal input/output control logic 221 may be implemented to process read/write (storage IO) of a VM requested through the host interface circuit 230. That is, IO processing for a non-volatile memory device (NVM) may be performed through the normal input/output control logic 221. The migration control logic 222 may be implemented to control an operation for migration requested by a hypervisor. The migration LRU buffer cache 223 may be implemented to store data according to a LRU buffer policy so as to minimize (for example, reduce or lessen) frequent bus occupancy occurring when a write request requested by a VM is directly transmitted to a destination device during the migration operation. The LRU buffer control policy 224 may be implemented to control the migration LRU buffer cache 223 to process LRU and similar LRU-based buffering policies.

The host interface circuit 230 may be connected to a hypervisor of a host device and a destination device, and thus may be implemented to perform communication. In some example embodiments, the host interface circuit 230 may be implemented as a P2P interface, for example, a CXL interface.

Figure 3:
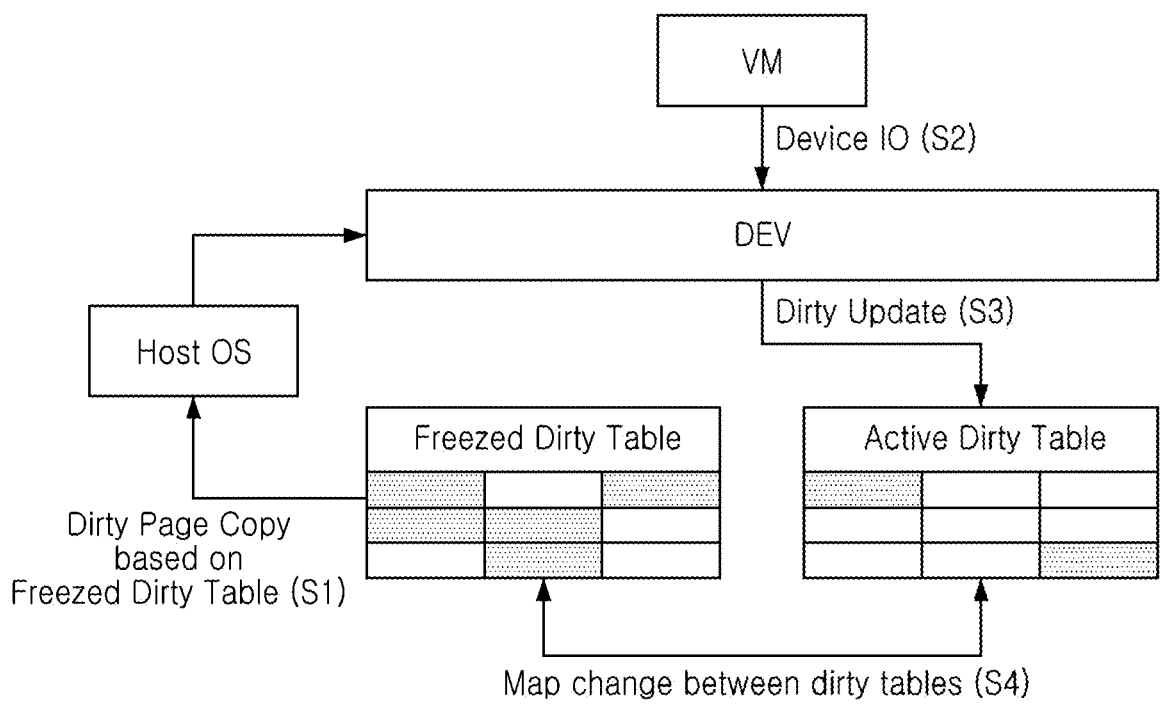
FIG. 3 is a diagram illustrating live migration of a general host system.

FIG. 3 is a diagram illustrating live migration of a general host system. Referring to FIG. 3, a device DEV may have two dirty tables based on a double buffered concepts. A host may find a dirty block through a freeze dirty table, and may perform copying (S1). However, the host may not be aware of information updated by a guest VM. Thus, in response to a request of the guest VM (S2), a dirty update request (S3) may be made. Such updated information may be recorded in an active dirty table (S4). That is, in this case, such a process may be repeatedly performed until the active dirty table is 0 or falls below a certain threshold. In an IO centric workload environment, migration may not be terminated. Meanwhile, a migration agent operation may consume a CPU resource.

Figure 4:
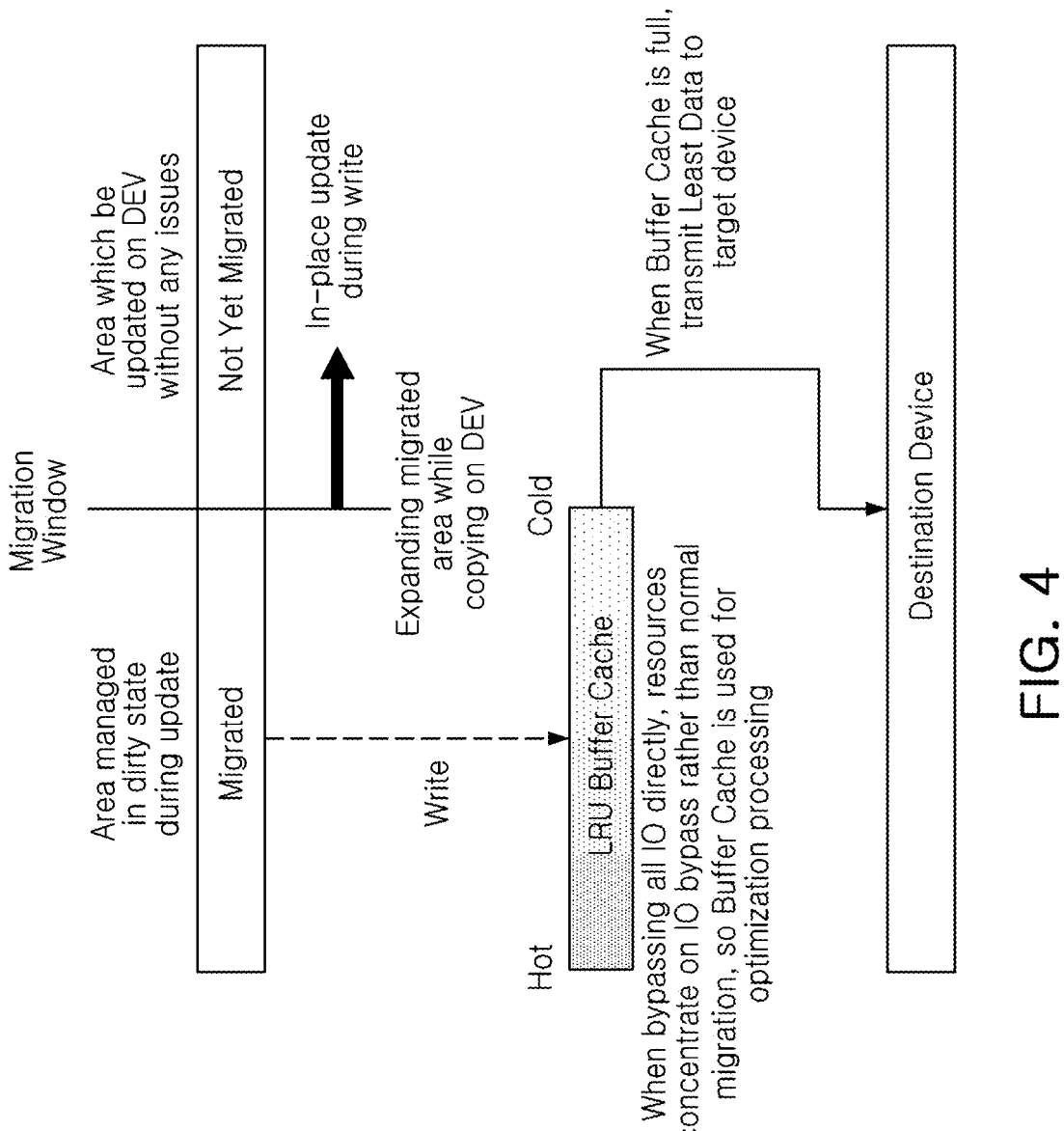
FIG. 4 is a diagram illustrating a live migration operation of a host system 1 according to some example embodiments of the present inventive concepts.

FIG. 4 is a diagram illustrating a live migration operation of a host system 1 according to some example embodiments of the present inventive concepts. Referring to FIG. 4, a smart device (or smart memory modules in FIGS. 2A and 2B) may have a migration window to manage live migration. Here, the migration window may be a boundary line separating a migrated area and a not yet migrated area from each other. Here, the migrated area is an area managed in a dirty state during update, and the not yet migrated area is an area in which there is no issue with respect to data consistency even when updated. The migration window may be a baseline for changing a method of processing an input/output operation (IO) when the IO occurs in a VM.

In general, an area present outside the migration window has not yet been completed, and thus an operation may be performed by applying an IO operation of a host to a local device without any changer. In an area present inside the migration window, original data has already been transmitted to a destination, and thus a notification to a remote device may be performed. In this case, in the case of simple bypass, bus and device overhead may be present due to frequent communication between devices. In the case of bypassing to the remote device without recording on the local device, there may be an overhead that needs to be brought from the remote device during a read operation. Thus, the following operation may need to be performed. An LRU-type buffer, managing all write operations by caching the write operations, may be used. Bus overhead may be minimized (for example, reduced or lessened) by buffering frequently accessed write operations through such an LRU buffer cache.

Regardless of such a buffering operation, when the buffer is full, the same update may be performed on the local device. During the read operation, an operation of minimizing (for example, reducing or lessening) latency by operating the local device may be performed.

Figure 5:
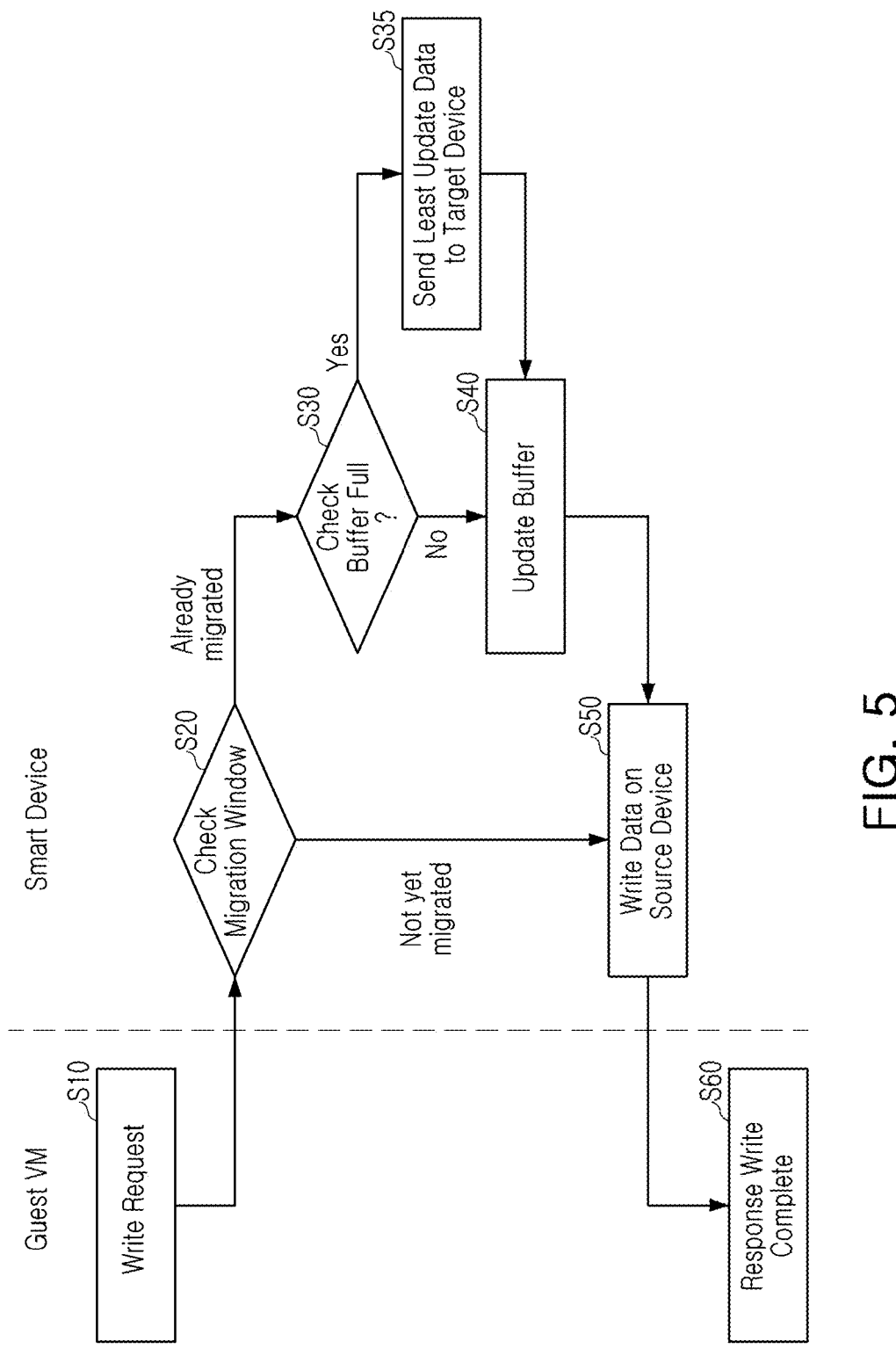
FIG. 5 is a flowchart illustrating a device-driven live migration operation of a host system 1 according to some example embodiments of the present inventive concepts.

FIG. 5 is a flowchart illustrating a device-driven live migration operation of a host system 1 according to some example embodiments of the present inventive concepts. Referring to FIGS. 1 to 5, the device-driven live migration operation may be performed as follows.

A guest virtual machine may issue a write request corresponding to a live migration operation, and may transmit the write request to a smart migration device (smart memory modules in FIGS. 2A and 2B) (S10). The smart migration device may receive the write request, and may check a migration window (S20). When the migration window indicates an area that has already been completed, it may be determined whether a LRU buffer cache is full (S30). When the LRU buffer cache is full, data that has not been accessed for the longest time may be transmitted to a target device (S35). Conversely, when the LRU buffer cache is not full, the LRU buffer cache may be updated to include data corresponding to the write request (S40). In operation S20, the migration window may indicate an area that has not yet been completed, or data may be written to a source device after operation S40 (S50). Thereafter, the guest virtual machine may receive, from the smart migration device, a response message indicating that a write operation corresponding to the write request has been completed (S60).

Figure 6:
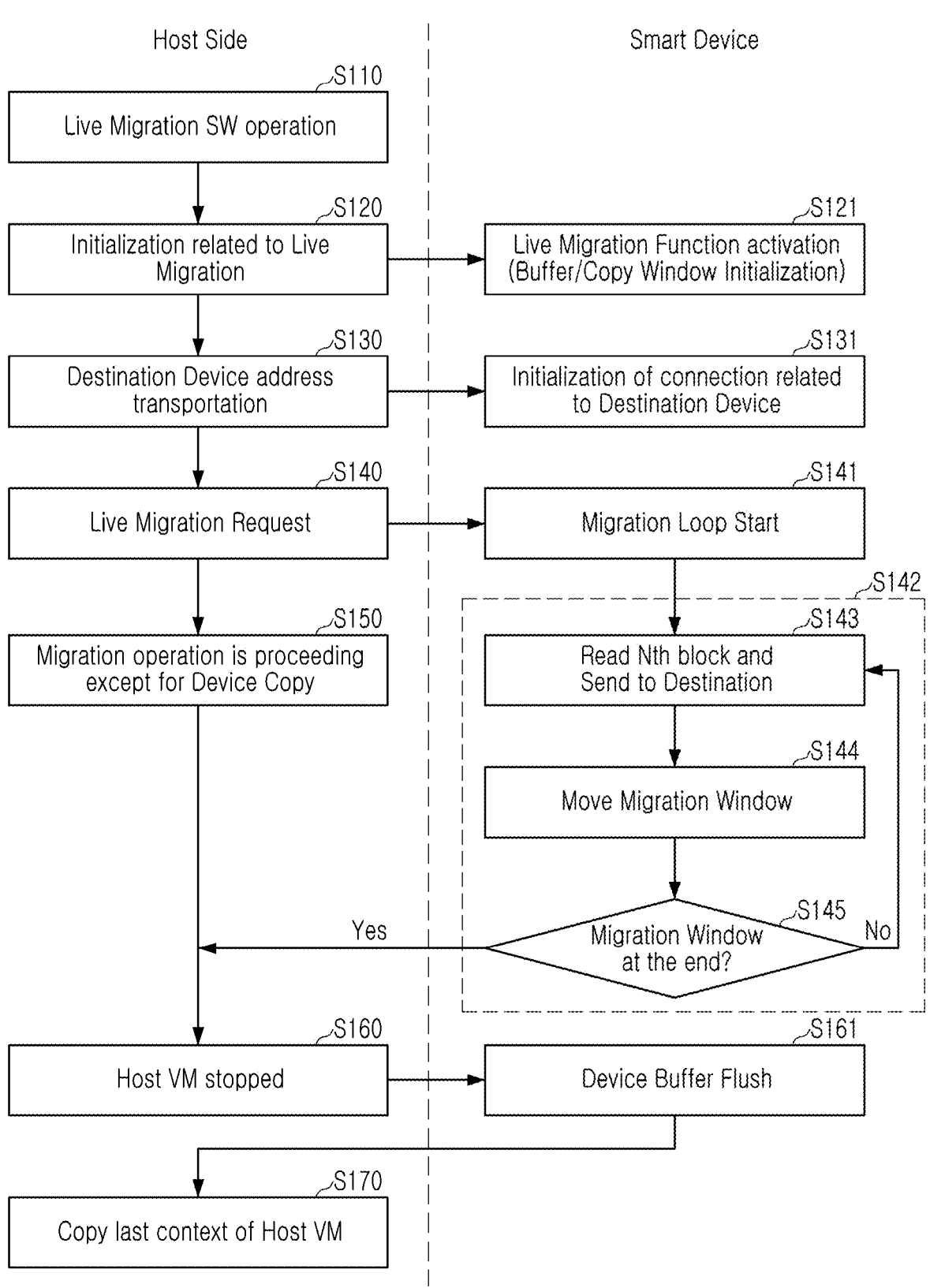
FIG. 6 is a flowchart illustrating a device-driven live migration operation of a host system 1 according to some example embodiments of the present inventive concepts.

FIG. 6 is a flowchart illustrating a device-driven live migration operation of a host system 1 according to some example embodiments of the present inventive concepts. Referring to FIGS. 1 to 6, a device-driven live migration operation may be performed as follows.

A host device (a source server) may perform a live migration software operation (S110). A live migration-related initialization operation may be performed (S120). A smart device may activate a live migration function according to a live migration-related initialization operation request (S120). For example, the smart device (or a smart memory module) may perform a buffer/copy window initialization operation (S121).

Thereafter, the host device may transmit a destination device address to the smart device (S130). The smart device may receive the destination device address, and may initialize a connection related to the destination device (S131).

Thereafter, the host device may issue a live migration request, and transmit the live migration request to the smart device (S140). The smart device may receive a smart migration request, and may start a migration loop (S141). Thereafter, a migration loop operation may be performed (S142). The migration loop operation may be performed as follows. The smart device may read N-th block data corresponding to a current loop, and may transmit the read block data to the destination device through P2P communication (S143). After the block data is transmitted, a migration window may be moved or expanded (S144). Thereafter, it may be determined whether the migration window is present at the end (S145). When the migration window is not a last migration window, operation S143 may be performed to perform a next loop.

The host device may perform the migration operation except device copying (S150). Thereafter, the host device may stop a live migration-related virtual machine (S160). In addition, when the migration window is present at the end in operation S145, operation S160 may be performed. Thereafter, the smart device may have a device buffer flushed (S161). Thereafter, the host device may copy a last context of a host virtual machine (S170).

Figure 7:
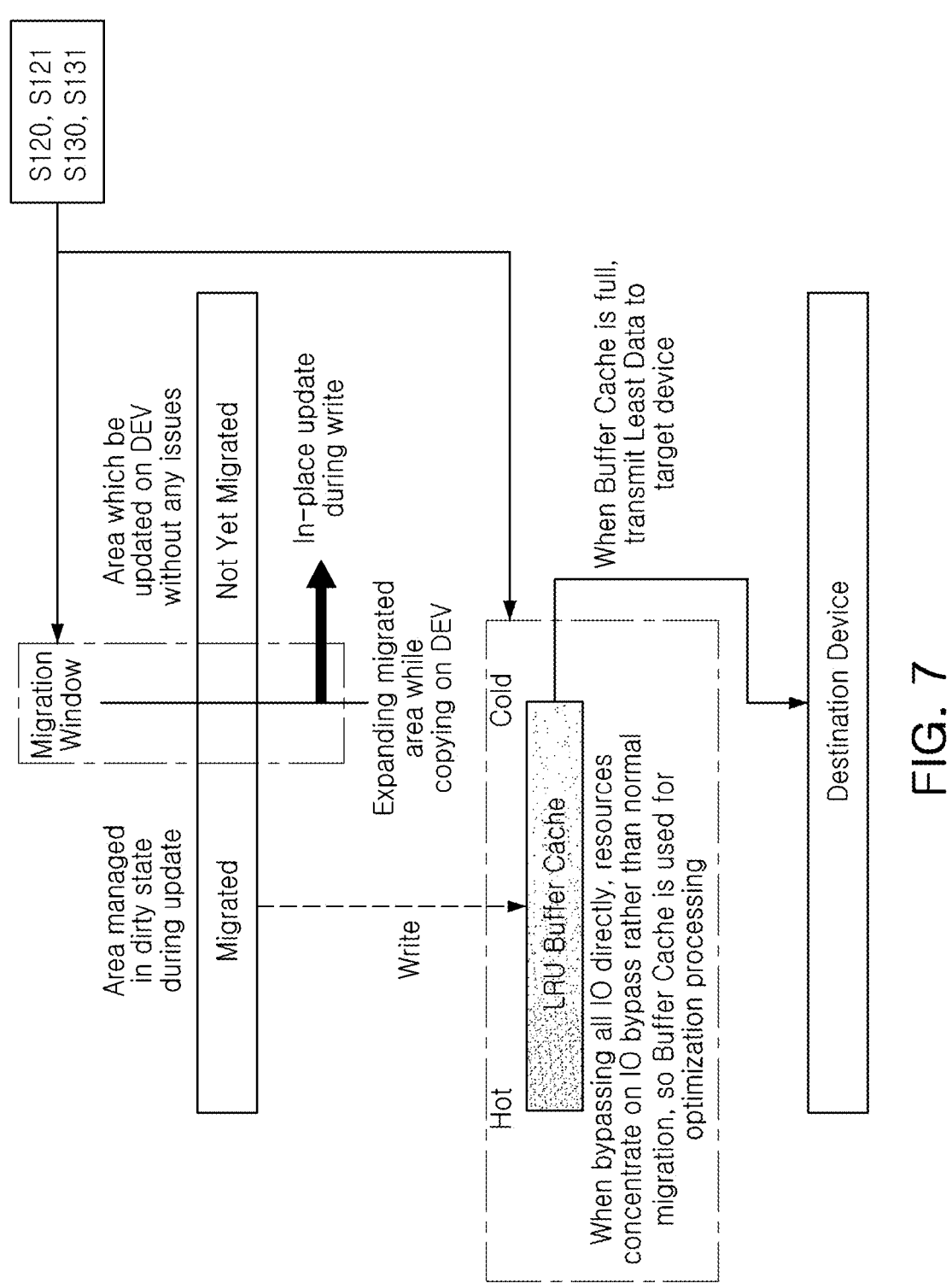
FIG. 7 is a diagram illustrating an initialization operation of a device-driven migration operation of a host system 1 according to some example embodiments of the present inventive concepts.

FIG. 7 is a diagram illustrating an initialization operation of a device-driven migration operation of a host system 1 according to some example embodiments of the present inventive concepts. Referring to FIG. 7, the host device may request a connection configuration and an initialization operation of a target device through a fabric manager 16 (see FIG. 1) (see S120 and S130 in FIG. 6). A smart device may initialize, based on information received from the host device, logics necessary for live migration (see S121 and S131 in FIG. 6). For example, the smart device may check a migration window and an LRU buffer cache.

Figure 8:
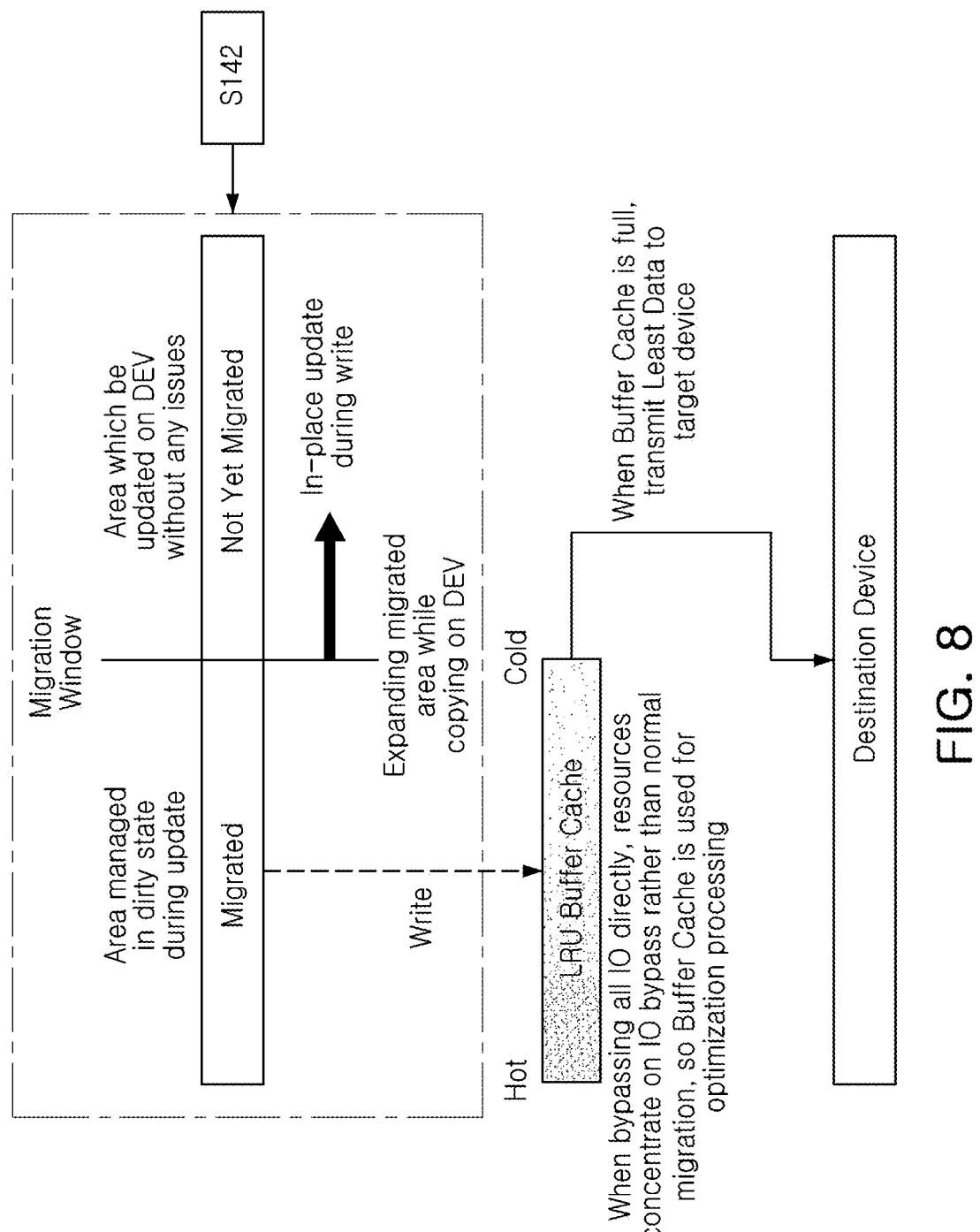
FIG. 8 is a diagram illustrating a migration operation of device-driven migration from the perspective of a migration controller in a host system 1 according to some example embodiments of the present inventive concepts.

FIG. 8 is a diagram illustrating a migration operation of device-driven migration from the perspective of a migration controller in a host system 1 according to some example embodiments of the present inventive concepts. Referring to FIG. 8, the migration operation may be performed as follows. A migration control logic of a smart device may copy actual stored data from a source device to a destination device while expanding a migration window. Migration may be completed at a point in time at which when a migrated area reaches 100%.

Figure 9:
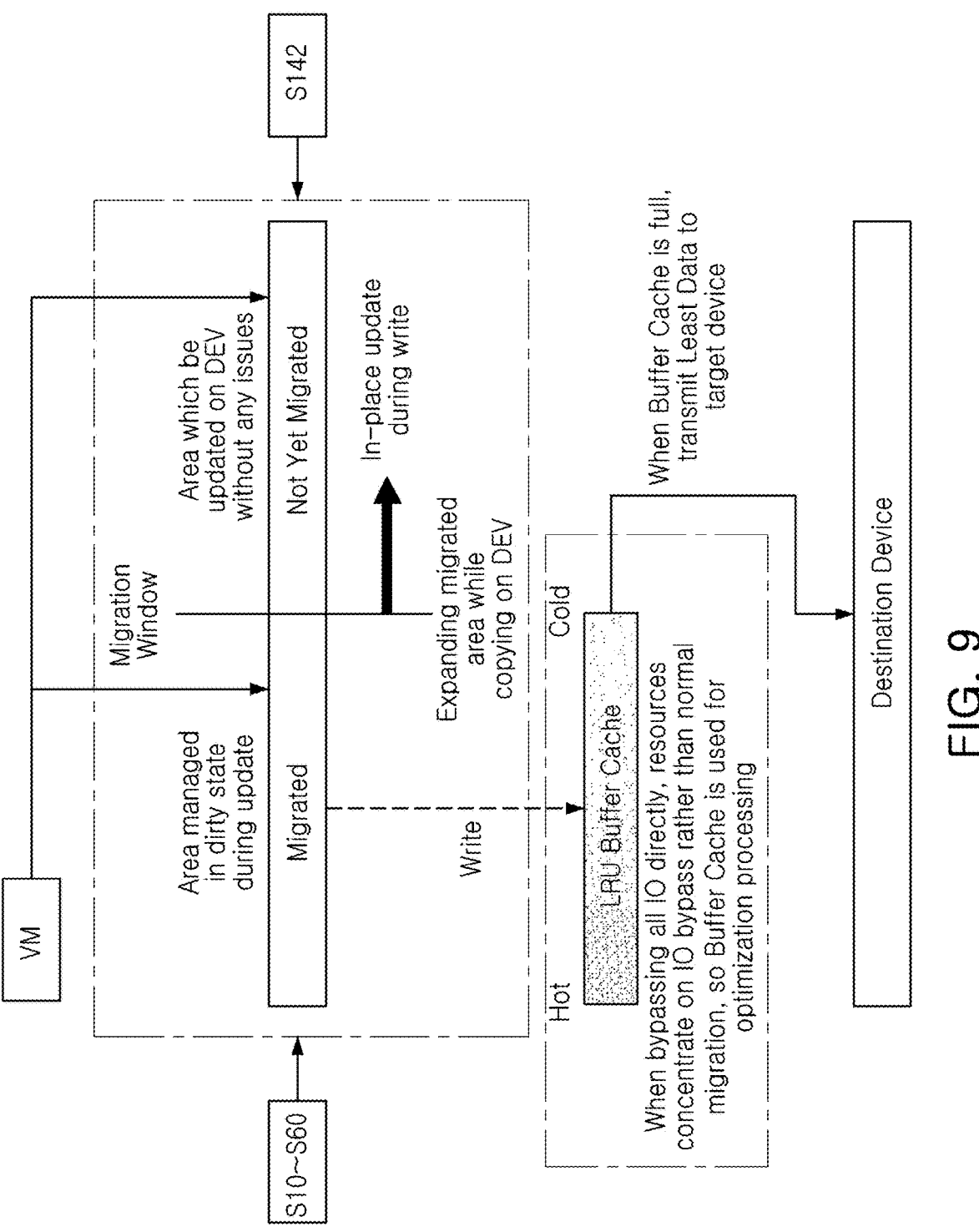
FIG. 9 is a diagram illustrating a device-driven migration operation from the perspective of a VM IO in a host system 1 according to some example embodiments of the present inventive concepts.

FIG. 9 is a diagram illustrating a device-driven migration operation from the perspective of a VM IO in a host system 1 according to some example embodiments of the present inventive concepts. Referring to FIG. 9, the following operation may be performed on an IO generated in a VM during live migration (see S10 to S60 in FIGS. 5 and S142 in FIG. 6). First, a not yet migrated area may be subject to an in-place update. This may be because the area is automatically migrated thereafter. Subsequently, the migrated area may be subject to the in-place update, and may transmit an IO to a migration LRU buffer cache. When the migration LRU buffer cache is full (buffer-full), a cold page may be transmitted to a target device according to a cache policy. Here, the cold page may be oldest data stored in the migration LRU buffer cache. Conversely, a hot page may be most recent data stored in the migration LRU buffer cache.

Figure 10:
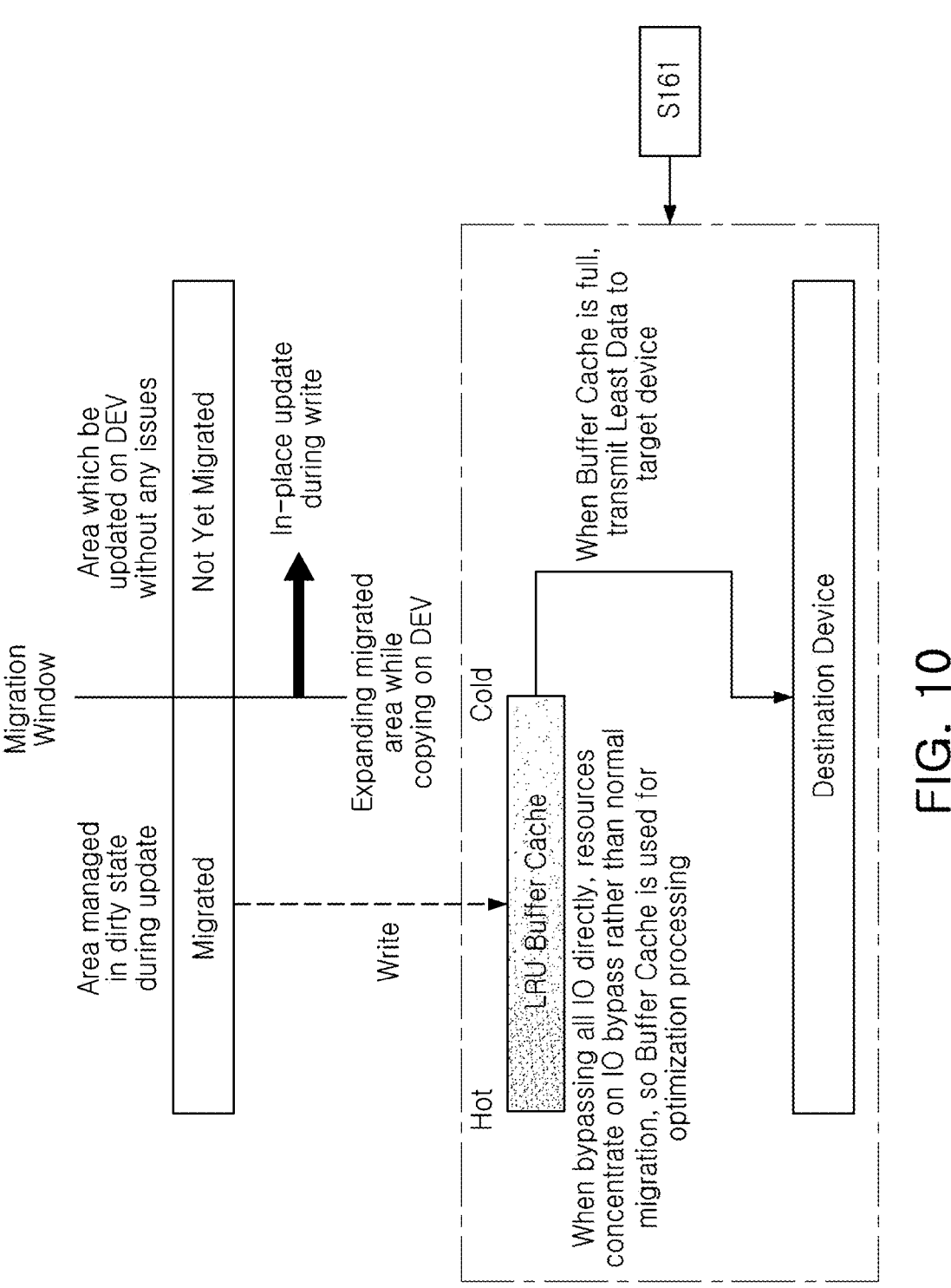
FIG. 10 is a diagram illustrating device buffer flushing of a host system 1 according to some example embodiments of the present inventive concepts.

FIG. 10 is a diagram illustrating device buffer flushing of a host system 1 according to some example embodiments of the present inventive concepts. Referring to FIG. 10, after migration is completed, a flush processing operation may be performed on an LRU buffer cache generated in a VM during live migration (see S161 in FIG. 6). In this case, an additional VM IO may occur, and thus the flush processing operation may be performed after the VM is stopped.

Figure 11:
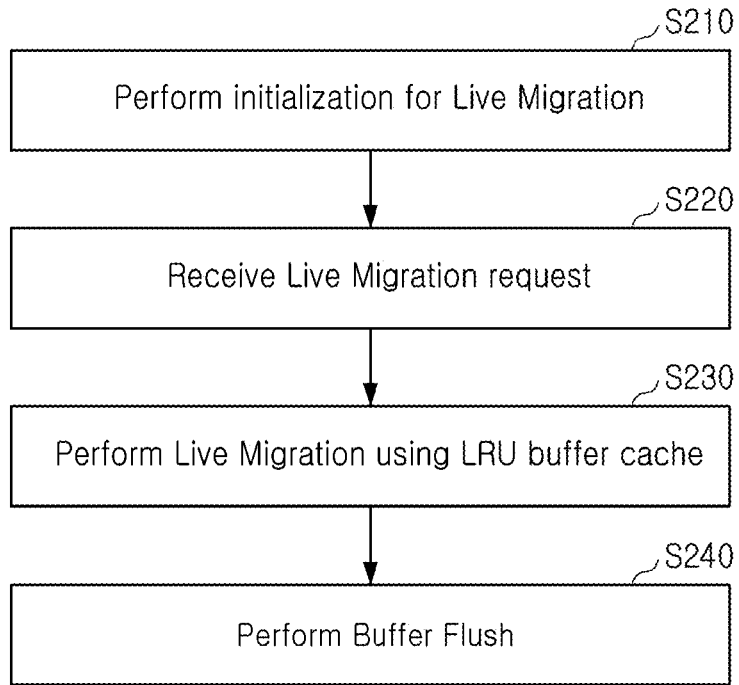
FIG. 11 is a flowchart illustrating a live migration operation of a smart device according to some example embodiments of the present inventive concepts.

FIG. 11 is a flowchart illustrating a live migration operation of a smart device according to some example embodiments of the present inventive concepts. Referring to FIGS. 1 to 11, a smart device (or a smart memory module) may perform a live migration operation as follows. The smart device may perform an initialization operation for live migration (S210). For example, the smart device may set and check a buffer/migration window. Thereafter, the smart device may receive, from a host device, a live migration request (S220). The smart device may perform the live migration operation (S230). Thereafter, the smart device may perform buffer flushing (S240).

In some example embodiments, a write request may be received from a host device. A migration window may be checked in response to the write request. When a migration window indicates a migrated area, it may be determined whether an LRU buffer cache is full. When the LRU buffer cache is not full, the LRU buffer cache may be updated to include data corresponding to the write request. In some example embodiments, when the LRU buffer cache is full, oldest data (or cold data), among pieces of data stored in the LRU buffer cache, may be transmitted to a target device, and then the LRU buffer cache may be updated to include the data corresponding to the write request. In some example embodiments, after the migration window indicates a not yet migrated area or the LRU buffer cache is updated, the data corresponding to the write request may be written to a source device. In some example embodiments, after the data is written to the source device, information on completion of the write request may be output to the host device.

The host system according to the present inventive concepts may be implemented as various types of memory/storage devices.

Figure 12A:
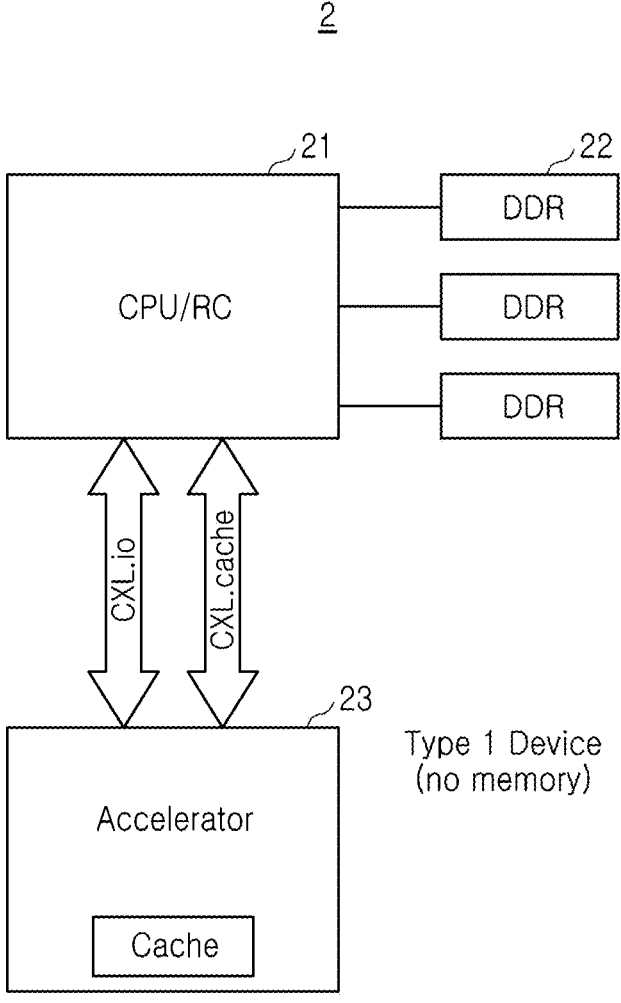
FIGS. 12A, 12B, and 12C are exemplary diagrams illustrating a host system according to some example embodiments of the present inventive concepts.
Figure 12B:
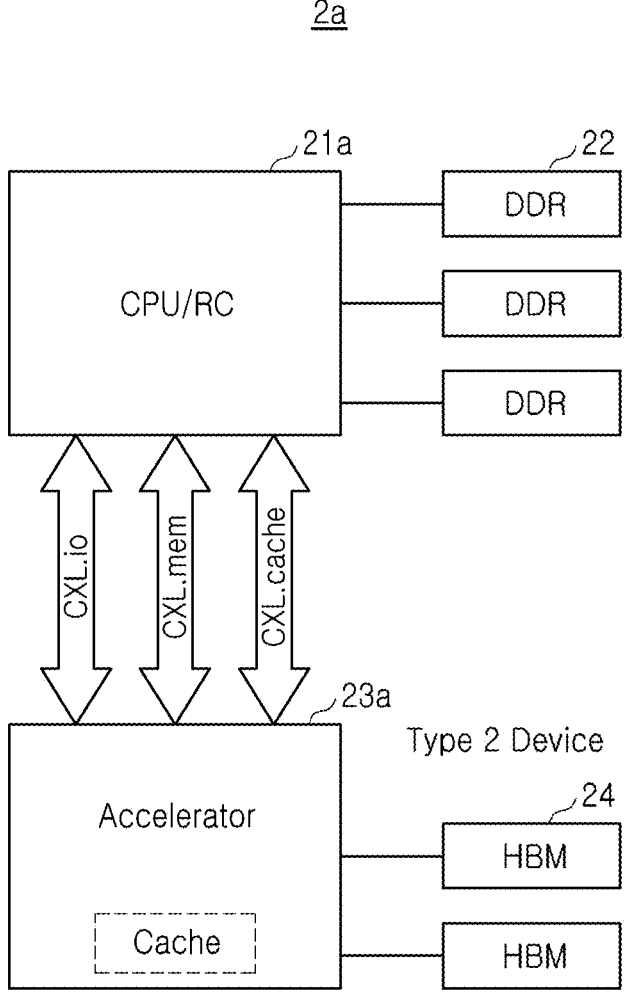
Figure 12C:
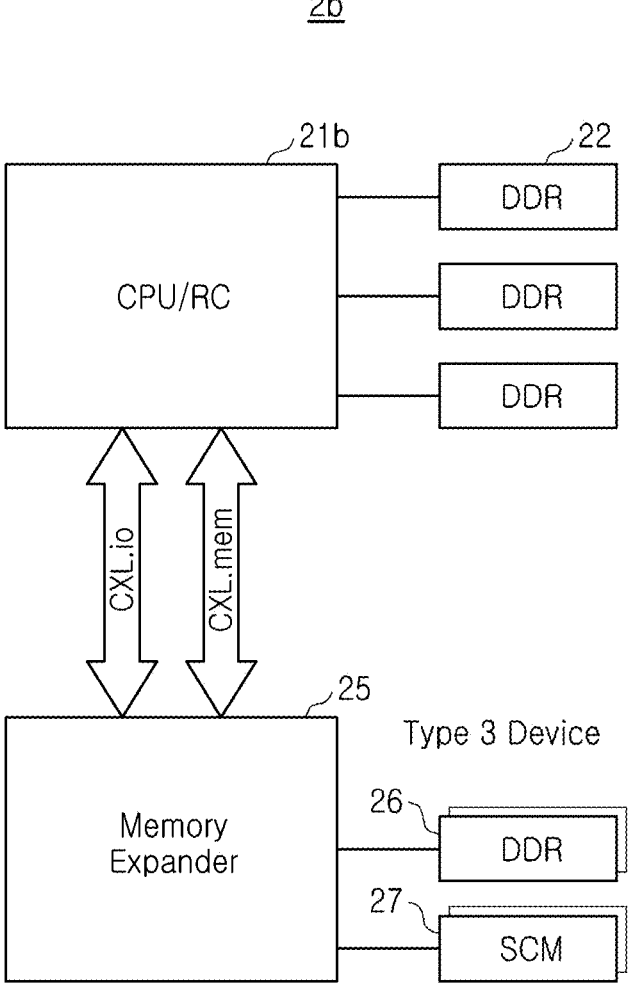

FIG. 12A is an exemplary diagram illustrating a host system 2 according to some example embodiments of the present inventive concepts. Referring to FIG. 12A, the host system 2 may include a processor (CPU/RC) 21, at least one memory module (DDR) 22, and an accelerator 23. The processor 21 and the accelerator 23 may perform communication through interfaces such as CXLio and CXLcache. FIG. 12B is a diagram illustrating a host system 2a according to some example embodiments of the present inventive concepts. Referring to FIG. 12B, the host system 2a may include a processor 21a, at least one memory module 22a, an accelerator 23a, and at least one high-bandwidth memory device (HBM) 24. The processor 21a and the accelerator 23a may perform communication through interfaces such as CXLio, CXLmem, and CXLcache. FIG. 12C is a diagram illustrating a host system 2b according to some example embodiments of the present inventive concepts. Referring to FIG. 12C, the host system 2b may include a processor 21b, at least one memory module 22b, a memory expander 25, at least one memory module (DDR) 26, and at least one non-volatile memory device (SCM) 27. The processor 21b and the memory expander 23b may perform communication through interfaces such as CXLio and CXLmem. As illustrated in FIGS. 12A, 12B, and 12C, a current target may be a storage-based NVMe Device with respect to a live migration operation. As illustrated in FIG. 12a, the current target may be classified as a Type 1 Device. As illustrated in FIG. 12B, when an accelerator is used, the current target may be provided as a Type 2 Device.

Figure 13:
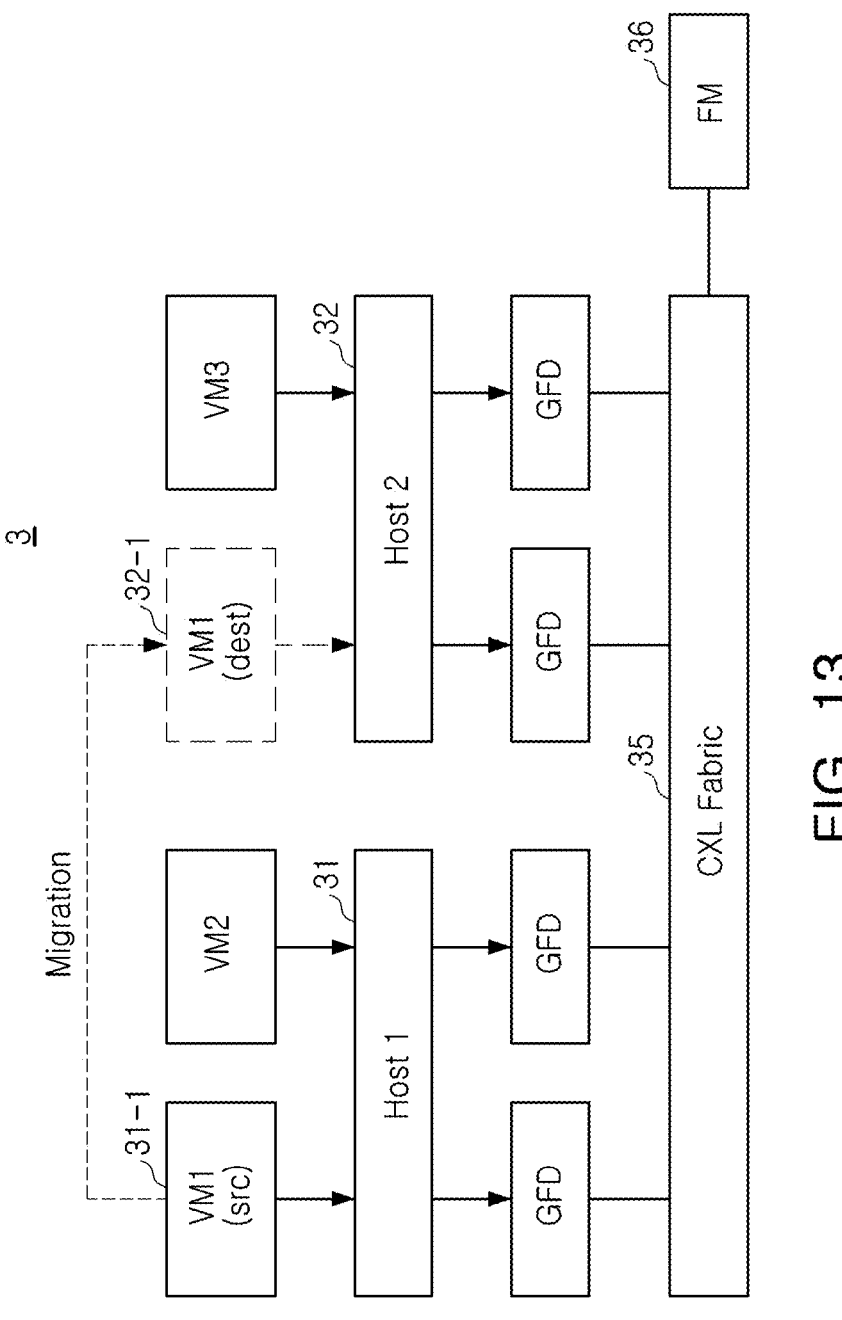
FIG. 13 is a diagram illustrating inter-system live migration of a host system 3 according to some example embodiments of the present inventive concepts.

According to the present inventive concept, inter-system live migration may be expanded through a CXL fabric 35 to process a live migration operation. FIG. 13 is a diagram illustrating inter-system live migration of a host system 3 according to some example embodiments of the present inventive concepts. Referring to FIG. 13, the host system 3 may include a CXL fabric 35 and a fabric manager (FM) 36, connecting a first host system, a second host system, and a GFD to each other. The host system 3 may perform live migration between the first host system and the second host system. As illustrated in FIG. 13, a live migration operation may be performed from a first virtual machine (VM1) 31-1 of a first host device 31 to a first virtual machine (VM1) 32-1 of a second host device 32.

Figure 14:
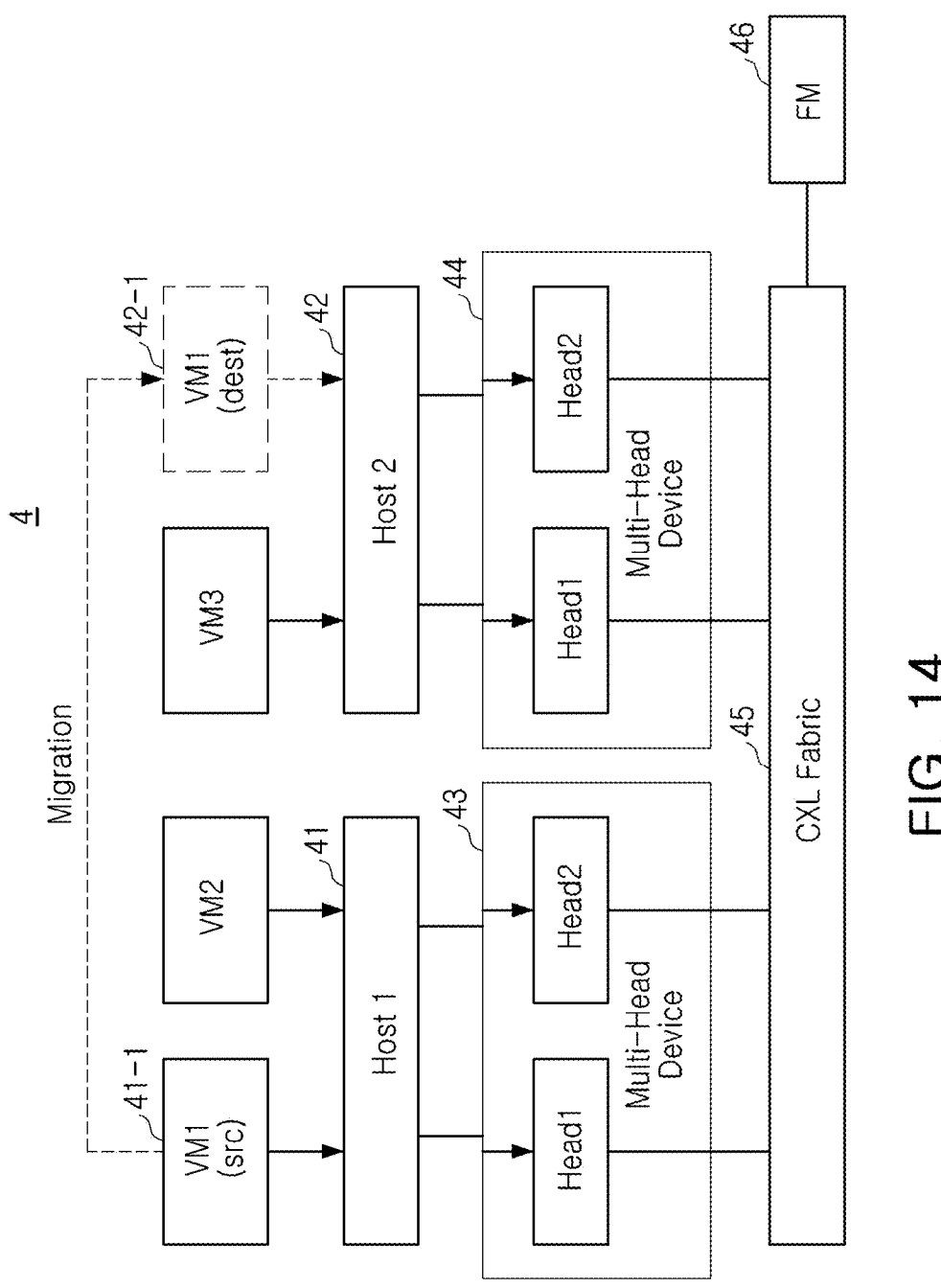
FIG. 14 is a diagram illustrating inter-system live migration of a host system 4 according to some example embodiments of the present inventive concepts.

The present inventive concepts may be applicable to a multi-head device (MHD). FIG. 14 is a diagram illustrating inter-system live migration of a host system 4 according to some example embodiments of the present inventive concepts. Referring to FIG. 14, the host system 4 may include a CXL fabric 45 and a fabric manager 46 connecting a first host system, a second host system, and MHDs 43 and 44 to each other. As illustrated in FIG. 14, a live migration operation may be performed from a first virtual machine (VM1) 41-1 of a first host device 41 to a first virtual machine (VM1) 42-1 of a second host device 42. NVMe and PCIe devices may respectively provide multiple physical end-points through SR-IOV related functions. One MHD may support multiple physical end-points. Using such technology, live migration may be supported in the same manner. Such technology may be used in a VM-based cloud and data center using a CXL. A non-stop system within a data center may be established. When established, only live migration may be currently supported through a share storage pool. However, when the present inventive concepts are used, not only an NVMe device but also a large-capacity DRAM may be provided through a virtualization environment. When the present inventive concepts are used in a hypervisor managing the virtualization environment, the virtualization environment, capable of minimizing (for example, reducing or lessening) a CPU resource consumed by a host for live migration, may be provided.

Figure 15:
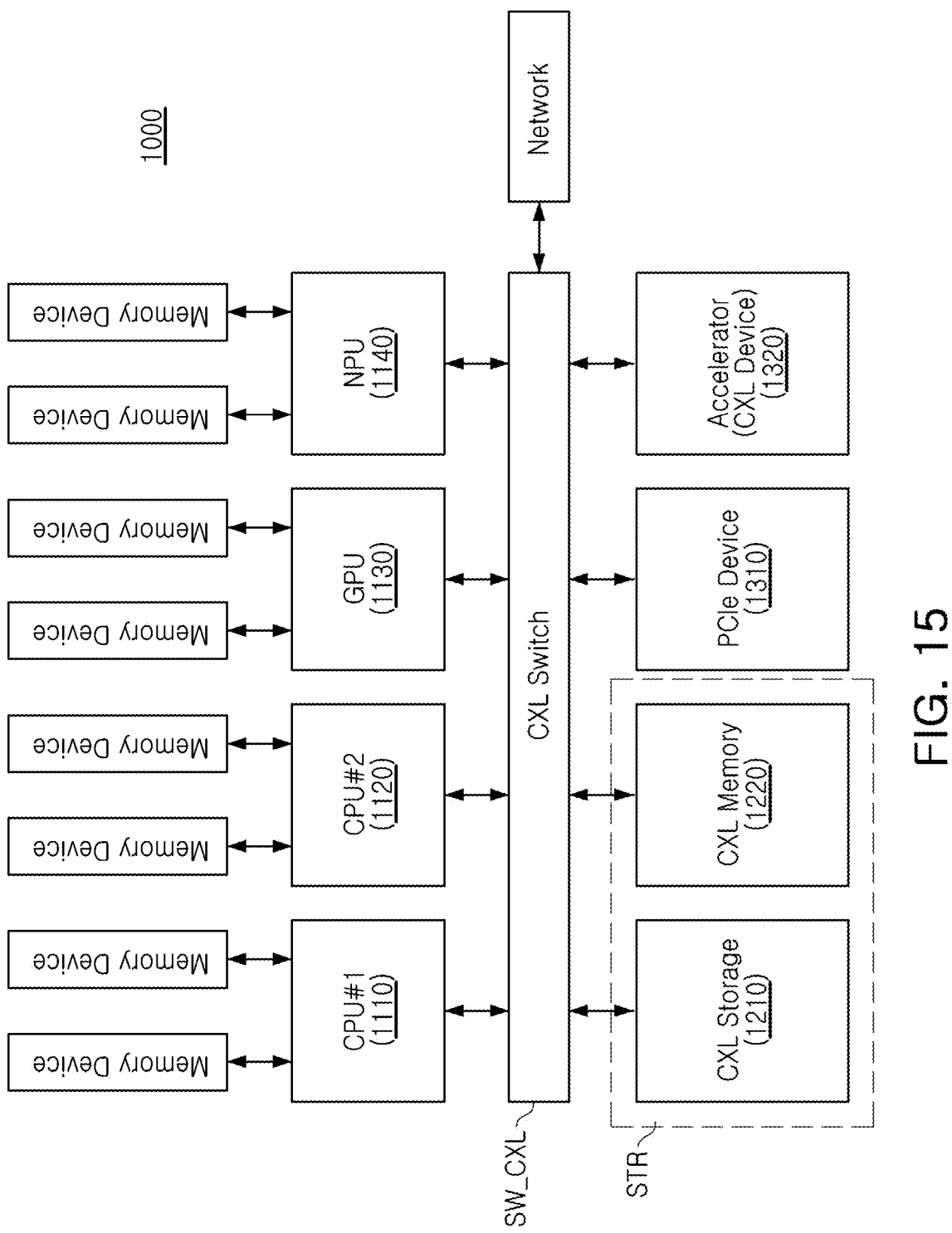
FIG. 15 is a diagram illustrating a computing system 1000 according to some example embodiments of the present inventive concepts.

FIG. 15 is a diagram illustrating a computing system 1000 according to some example embodiments of the present inventive concepts. Referring to FIG. 15, the computing system 1000 may include a first CPU 1110, a second CPU 1120, a GPU 1130, an NPU 1140, a CXL switch SW_CXL, a CXL storage device 1210, and a CXL memory device 1220, a PCIe device 1310, and an accelerator (CXL device) 1320.

The first CPU 1110, the second CPU 1120, the GPU 1130, the NPU 1140, the CXL storage device 1210, the CXL memory device 1220, the PCIe device 1310, and the accelerator (CXL device) 1320 may be, in common, connected to the CXL switch SW_CXL, and may communicate with each other through the CXL switch SW_CXL. In some example embodiments, each of the first CPU 1110, the second CPU 1120, the GPU 1130, and the NPU 1140 may be a host described with reference to FIGS. 1 to 14, and the first CPU 1110, the second CPU 1120, the GPU 1130, and the NPU 1140 may be directly connected to individual memory devices, respectively. At least a portion of an area of the CXL memory device 1220 may be allocated as a dedicated area for the CXL storage device 1210 by one or more of the first CPU 1110, the second CPU 1120, the GPU 1130, and the NPU 1140. That is, the CXL storage device 1210 and the CXL memory device 1220 may be used as a storage space STR of the computing system 1000. In addition, the CXL storage device 1210 and the CXL memory device 1220 may be implemented to perform device-driven live migration in response to a live migration request from the host device as described in FIGS. 1 to 14.

In some example embodiments, the CXL switch SW_CXL may be connected to the PCIe device 1310 or the accelerator 1320 configured to support various functions, and the PCIe device 1310 or the accelerator 1320 may communicate with each of the first CPU 1110, the second CPU 1120, the GPU 1130, and the NPU 1140 through the CXL switch SW_CXL, or may access the storage space STR including the CXL storage device 1210 and the CXL memory device 1220. In some example embodiments, the CXL switch SW_CXL may be connected to an external network or fabric, and may be configured to communicate with an external server through the external network or fabric.

Figure 16:
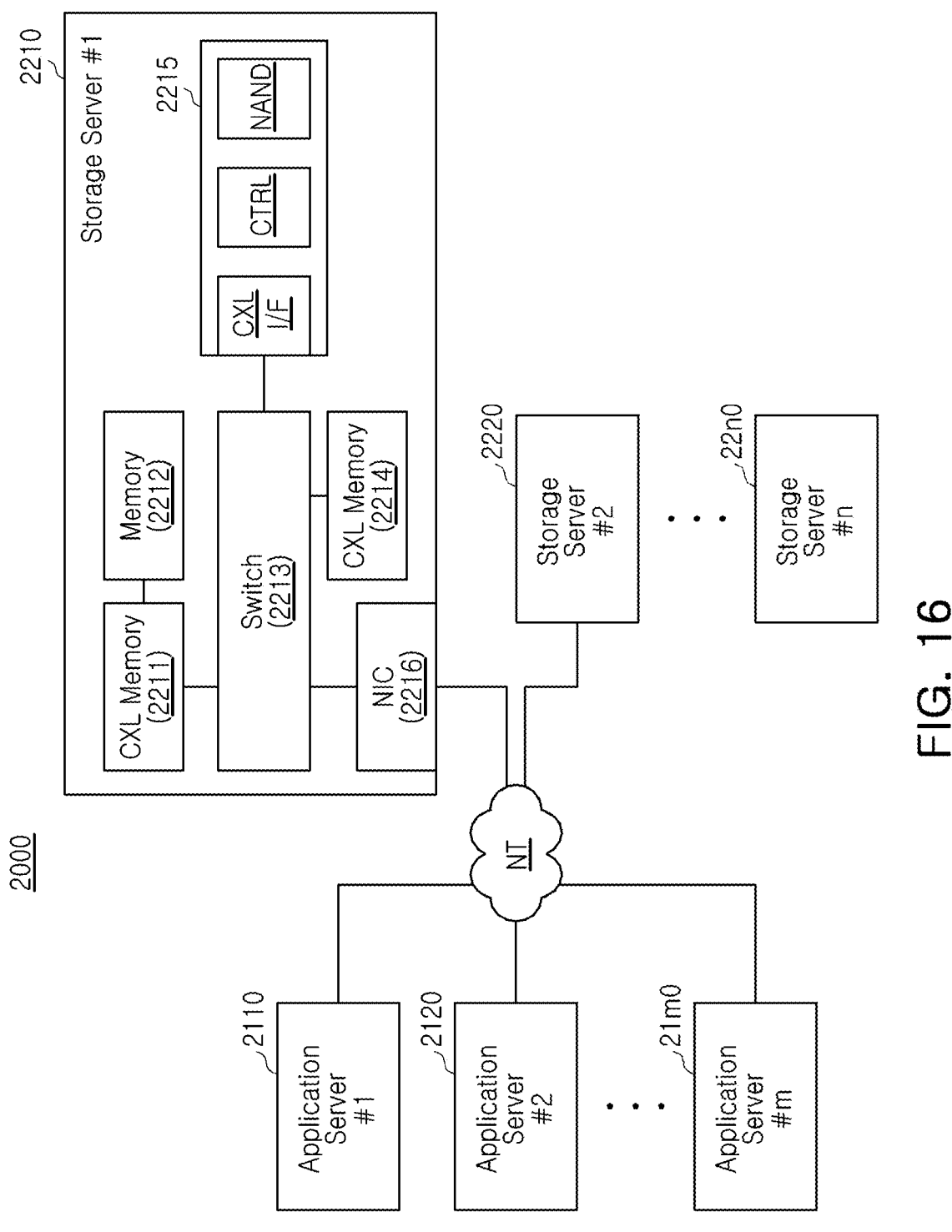
FIG. 16 is a diagram illustrating a data center to which a computing system according to some example embodiments of the present inventive concepts are applied.

FIG. 16 is a diagram illustrating a data center to which a computing system according to some example embodiments of the present inventive concepts are applied. Referring to FIG. 16, a data center 2000 may be a facility collecting various pieces of data and providing a service, and may also be referred to as a data storage center. The data center 2000 may be a system for operating a search engine and a database, and may be a computing system used in a company such as a bank or a government agency. The data center 2000 may include application servers 2110 to 21*m*0 and storage servers 2210 to 22*n*0. In some example embodiments, the number of application servers and the number of storage servers may be selected in various manners, and the number of application servers and the number of storage servers may be different from each other. Hereinafter, a configuration of the first storage server 2210 will be mainly described. The application servers 2110 to 21*m*0 and the storage servers 2210 to 22*n*0 may have a similar structure, and the application servers 2110 to 21*m*0 and the storage servers 2210 to 22*n*0 may communicate with each other through a network NT.

The first storage server 2210 may include a processor 2211, a memory 2212, a switch 2213, a storage device 2215, a CXL memory 2214, and a network interface card (NIC) 2216. The processor 2211 may control an overall operation of the first storage server 2210, and may access the memory 2212 to execute an instruction loaded into the memory 2212 or to process data. The memory 2212 may be a double data rate synchronous dram (DDR SDRAM), a high-bandwidth memory (HBM), a hybrid Memory Cube (HMC), a dual in-line memory module (DIMM), an Optane DIMM, or a non-volatile DIMM (NVDIMM). The processor 2211 and the memory 2212 may be directly connected to each other, and the number of processors 2211 and memories 2212, included in one storage server 2210, may be selected in various manners.

In some example embodiments, the processor 2211 and the memory 2212 may provide a processor-memory pair. In some example embodiments, the number of processors 2211 and the number of memories 2212 may be different. The processor 2211 may include a single core processor or a multi-core processor. The above description of the storage server 2210 may be similarly applied to each of the application servers 2110 to 21*m*0.

The switch 2213 may be configured to mediate or route communication between various components included in the first storage server 2210. In some example embodiments, the switch 2213 may be a switch implemented based on a CXL protocol. The CXL memory 2214 may be connected to the switch 2213. In some example embodiments, the CXL memory 2214 may be used as a memory expander for the processor 2211. Alternatively, the CXL memory 2214 may be allocated as a dedicated memory or buffer memory for the storage device 2215. The storage device 2215 may include a CXL interface circuit CXL_IF, a controller CTRL, and a NAND flash NAND. The storage device 2215 may store data or output stored data according to a request of the processor 2211. In some example embodiments, the storage device 2215 may be CXL storage. In some example embodiments, the storage device 2215 may allocate at least a portion of an area of the CXL memory 2214 as a dedicated area, and may use the dedicated area as a buffer memory (that is, map data being stored in the CXL memory 2214).

In some example embodiments, the application servers 2110 to 21*m*0 may not include the storage device 2215. The storage server 2210 may include at least one storage device 2215. In some example embodiments, the number of storage devices 2215, included in the storage server 2210, may be selected in various manners.

A network interface card (NIC) 2216 may be connected to the CXL switch SW_CXL. The NIC 2216 may communicate with other storage servers 2220 to 22*n*0 or other application servers 2110 to 21*m*0 through the network NT. In some example embodiments, the NIC 2216 may include a network interface card, a network adapter, and the like. The NIC 2216 may be connected to the network NT by a wired interface, a wireless interface, a Bluetooth interface, an optical interface, or the like. The NIC 2216 may include an internal memory, a digital signal processor (DSP), a host bus interface, and the like, and may be connected to the processor 2211 or the switch 2213 through the host bus interface. In some example embodiments, the NIC 2216 may be integrated with at least one of the processor 2211, the switch 2213, and the storage device 2215.

In some example embodiments, the network NT may be implemented using a fiber channel (FC) or Ethernet. In this case, the FC may be a medium used for relatively high-speed data transmission, and may use an optical switch providing high performance and high availability. Depending on an access method of the network NT, storage servers may be provided as file storage, block storage, or object storage. In some example embodiments, the network NT may be a dedicated storage network such as a storage area network (SAN). For example, the SAN may be an FC-SAN using an FC network, the FC-SAN implemented according to a FC Protocol (FCP). For another example, the SAN may be an IP-SAN using a TCP/IP network, the IP-SAN implemented according to an SCSI over TCP/IP or Internet SCSI (iSCSI) protocol. In some example embodiments, the network NT may be a general network such as a TCP/IP network. For example, the network NT may be implemented according to a protocol such as FC over Ethernet (FCOE), network-attached storage (NAS), NVMe over fabrics (NVMe-oF), or the like.

In some example embodiments, at least one of the application servers 2110 to 21*m*0 may store data requested by a user or client to be stored in one of the storage servers 2210 to 22*n*0 through the network NT. At least one of the application servers 2110 to 21*m*0 may obtain data requested to be read by the user or client from one of the storage servers 2210 to 22*n*0 through the network NT. For example, at least one of the application servers 2110 to 21*m*0 may be implemented as a web server or a database management system (DBMS). In some example embodiments, at least one of the application servers 2110 to 21*m*0 may access a memory, a CXL memory, or a storage device included in another application server through the network NT, or may access memories, CXL memories, or storage devices included in the storage servers 2210 to 22*n*0 through the network NT. Accordingly, at least one of the application servers 2110 to 21*m*0 may perform various operations on data stored in other application servers or storage servers. For example, at least one of the application servers 2110 to 21*m*0 may execute an instruction for moving or copying data between the other application servers or storage servers. In this case, data may be moved from storage devices of storage servers to memories or CXL memories of application servers through memories or CXL memories of the storage servers, or may be moved directly from the storage devices of the storage servers to the memories or CXL memories of the application servers or. Data, moving through a network, may be encrypted data for security or privacy.

In some example embodiments, with respect to a storage device included in at least one of the application servers 2110 to 21*m*0 and the storage servers 2210 to 22*n*0, a CXL memory included in at least one of the application servers 2110-21*m*0 and the storage servers 2210-22*n*0 may be allocated as a dedicated area, and the storage device may use the allocated dedicated area as a buffer memory, that is, may store map data. For example, with respect to the storage device 2215 included in the storage server 2210*a*, a CXL memory included in another storage server (for example, 22*n*0) may be allocated, and the storage device 2215 may access the CXL memory included in the other storage server (for example, 22*n*0) through the switch 2213 and the NIC 2216. In this case, map data for the storage device 2215 of the first storage server 2210 may be stored in the CXL memory of the other storage server 22*n*0. That is, storage devices and CXL memories of a data center according to the present inventive concepts may be connected to each other and implemented in various manners.

In addition, terms such as first, second, third and the like may be used herein to describe components according to the present inventive concepts. The terms are used merely to distinguish a corresponding component from other component(s), but do not limit the present inventive concepts. For example, the terms such as first, second, third, and the like do not imply an order or any form of numerical meaning. Components according to example embodiments of the present inventive concepts have been referenced using the blocks described above. The blocks may be implemented as various hardware devices such as an integrated circuit (IC), an application specific IC (ASIC), a field programmable gate array (FPGA), a complex programmable logic device (CPLD), firmware running on the hardware devices, software such as application, or a combination of hardware devices and software. In addition, the blocks may include circuits including semiconductor devices in an IC or circuits registered as intellectual property (IP).

The device described above may be implemented as a hardware component, a software component, and/or a combination of the hardware component and the software component. As described herein, any electronic devices and/or portions thereof according to any of the example embodiments may include, may be included in, and/or may be implemented by one or more instances of processing circuitry such as hardware including logic circuits; a hardware/software combination such as a processor executing software; or any combination thereof. For example, a device and a component according to example embodiments may be implemented using one or more general purpose or special purpose computers, such as a processor, controller, arithmetic logic unit (ALU), digital signal processor, microcomputer, field programmable gate array (FPGA), programmable logic unit (PLU), microprocessor, or any other device capable of executing and responding to instructions. For example, the processing circuitry more specifically may include, but is not limited to, a central processing unit (CPU), an arithmetic logic unit (ALU), a graphics processing unit (GPU), an application processor (AP), a digital signal processor (DSP), a microcomputer, a field programmable gate array (FPGA), and programmable logic unit, a microprocessor, application-specific integrated circuit (ASIC), a neural network processing unit (NPU), an Electronic Control Unit (ECU), an Image Signal Processor (ISP), and the like. In some example embodiments, the processing circuitry may include a non-transitory computer readable storage device (e.g., a memory), for example a DRAM device, storing a program of instructions, and a processor (e.g., CPU) configured to execute the program of instructions to implement the functionality and/or methods performed by some or all of any devices, systems, modules, units, controllers, circuits, architectures, and/or portions thereof according to any of the example embodiments, and/or any portions thereof. A processing device may include an operating system (OS) and one or more software applications executed on the operating system. In addition, the processing device may also access, store, manipulate, process, and generate data in response to execution of software. For ease of understanding, in some case, it is described that the processing device is used a single processing element, but those skilled in the art could recognize that the processing device may include a plurality of processing elements or multiple types of processing elements. For example, the processing device may include a plurality of processors, or one processor and one controller. In addition, other processing configurations are also possible, such as parallel processors.

The software may include a computer program, a code, an instruction, or one or more combinations thereof, and may configure the processing device to operate as desired, or may independently or collectively instruct the processing device. The software and/or data may be embodied in any type of machine, component, physical device, virtual equipment, computer storage medium, or device so as to be interpreted by the processing device, or to provide instructions or data to the processing device. The software may also be distributed on a computer system via a network, and may be stored or executed in a distributed manner. The software and data may be stored on one or more computer-readable recording media.

In a technique according to the related art, an agent of a host system, performing live migration, may directly access a device and operate by reading data. However, in this case, in the case of a write operation processed by an application within a VM during a live migration operation, a live migration agent may not check the operation, and thus may require a data structure such as a dirty map supported by the device. The agent, using a CPU of a host, may directly perform migration until the dirty map becomes empty. When an interface such as CXL 3.0 and an application environment are created, individual devices may operate in the same manner as smart devices. Thus, a migration operation that needs to be processed directly by the host CPU may be offloaded to the device, thereby minimizing (for example, reducing or lessening) unnecessary operations and data structures for communication between the host and the device.

In general, in a cloud based on virtualization, a live migration technique may be widely used in which a virtual machine instance is moved to another physical server during runtime to ensure even distribution of system stability and performance. In a system according to the related art, it may be difficult to move data between systems with respect to independent storage and an equivalent memory device during live migration, and thus only connection information may be changed using a storage pool and a memory pool, separated by a network, during live migration. Such a method may make it difficult to support high performance. In addition, data may be transmitted directly to a host through a vendor command using SR-IOV or a similar technique, but host overhead may be high. A live migration method according to the related art may require a dirty map, managing a dirty state of a device for live migration. A migration manager of the host may need to read the dirty map and directly copy the dirty page.

A live migration method according to some example embodiments of the present inventive concepts may offload a migration operation to a device for performing migration using a P2P communication function, and may be implemented as a P2P-based live migration technique between memory devices of a high-speed system bus, and a smart memory module supporting the same. The smart memory module may include a memory controller, and may internally include a normal IO control logic, a migration control controller, a migration LRU buffer cache, and an LRU buffer control policy. The memory device may be connected to a system through a host interface logic, and P2P communication with the same type of memory device may be performed by means of a host system. The device may include an RAM and a flash chip, and may be used as a memory device or storage device.

The migration controller may support the following operations. The migration controller may perform migration using 1 read operation through a migration window. When IO occurs for a migrated area, the migration controller may be buffered within the device through the LRU buffer cache, and the migration operation may be processed from cold data (oldest data) to a target device under a buffer-full condition.

A smart memory module, a host system including the same, and a method of operating the same according to some example embodiments of the present inventive concepts may support device-to-device communication through a peer-to-peer (P2P) connection.

The smart memory module, the host system including the same, and the method of operating the same according to some example embodiments of the present inventive concepts may support offloading of live migration to enable copying to a remote memory through a network interface card (NIC), thereby performing rapid live migration.

The smart memory module, the host system including the same, and the method of operating the same according to some example embodiments of the present inventive concepts may minimize (for example, reduce or lessen) an amount of a system resource used and significantly improve a related-processing speed through offloading of a live migration operation. For example, according to some example embodiments, there may be an increase in processing capability, speed, accuracy, longevity and/or power efficiency of the host system based on the above methods. Therefore, the improved devices and methods overcome the deficiencies of the conventional devices and methods of managing data, particularly related to live migration, etc., while reducing resource consumption (e.g., processing capability, power), improving data accuracy, and resource allocation (e.g., latency). For example, by supporting P2P connections according to some example embodiments, the host system may perform fewer operations, reducing power consumption and improving longevity while providing more consistent access to data. Further, there is an improvement in communication and reliability in the devices by providing the abilities disclosed herein.

The smart memory module, the host system including the same, and the method of operating the same according to some example embodiments of the present inventive concepts may offload dirty block management occurring during the live migration operation, thereby improving a procedure of the live migration operation.

While example embodiments have been shown and described above, it will be apparent to those skilled in the art that modifications and variations could be made without departing from the scope of the present inventive concepts as defined by the appended claims.

What is claimed is:

1. A smart memory module comprising:
at least one memory device connected to at least one channel;
a controller configured to control the at least one memory device, the controller including a least recently used (LRU) buffer cache configured to store buffer data; and
a host interface circuit configured to perform peer-to-peer (P2P) communication with an external device, and to receive, from a host device, a live migration request,
the controller configured to perform, in response to the live migration request, a migration operation of transmitting the buffer data to a target device through the P2P communication under a buffer-full condition.

2. The smart memory module of claim 1, wherein the controller includes:
a migration control logic configured to control the migration operation.

3. The smart memory module of claim 2, wherein the migration control logic is configured to check a migration window separating a migrated area and a not yet migrated area from each other.

4. The smart memory module of claim 3, wherein
the migrated area is an area managed in a dirty state during update, and
the not yet migrated area has no issue with respect to data consistency even after updating.

5. The smart memory module of claim 3, wherein the LRU buffer cache is buffered in response to input/output occurring in the migrated area.

6. The smart memory module of claim 3, wherein the LRU buffer cache is configured to transmit oldest data to the target device under the buffer-full condition.

7. The smart memory module of claim 1, wherein
the host device is configured to request a connection configuration and an initialization operation of the target device through a fabric manager, and
an initialization operation for a live migration is performed according to a request of the host device.

8. The smart memory module of claim 1, wherein the controller is configured to perform a flushing operation on a LRU buffer cache generated in a virtual machine, after the live migration is completed.

9. The smart memory module of claim 8, wherein the flushing operation is performed, after the virtual machine is stopped.

10. The smart memory module of claim 1, wherein
the at least one memory device includes a volatile memory device or a non-volatile memory device, and
the P2P communication includes a compute express link (CXL) interface.

11. A method of operating a smart memory module, the method comprising:
performing an initialization operation for live migration from a host device;

receiving, from the host device, a live migration request; and performing, in response to the live migration request, a migration operation using a least recently used (LRU) buffer cache, the migration operation flushing data stored in the LRU buffer cache to a target device through peer-to-peer (P2P) communication, in response to the LRU buffer cache being full.

12. The method of claim 11, wherein the performing the migration operation includes:

receiving, from the host device, a write request;

checking a migration window in response to the write request;

determining whether the LRU buffer cache is full, in response to the migration window indicating a migrated area; and updating the LRU buffer cache to include data corresponding to the write request, in response to the LRU buffer cache being not full.

13. The method of claim 12, wherein the performing the migration operation further includes:

transmitting, to the target device, oldest data, among pieces of the data stored in the LRU buffer cache, in response to the LRU buffer cache being full; and updating the LRU buffer cache to include the data corresponding to the write request, after the oldest data is transmitted to the target device.

14. The method of claim 13, wherein the performing the migration operation further includes:

writing, to a source device, the data corresponding to the write request, after the migration window indicates a not yet migrated area or the LRU buffer cache is updated.

15. The method of claim 14, further comprising:

outputting, to the host device, information on completion of the write request, after the data is written to the source device.

* * * * *